G. B. READ.
HOISTING JACK AND CONTROL THEREFOR.
APPLICATION FILED JAN. 13, 1919.
1,305,006.
Patented May 27, 1919.
3 SHEETS—SHEET 1.
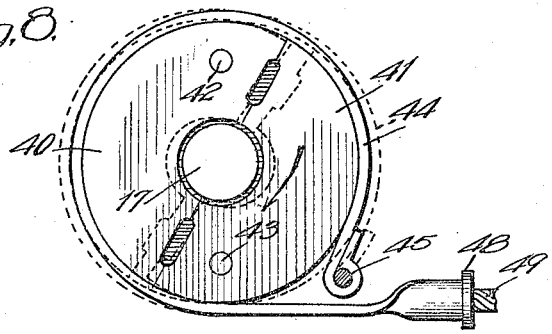
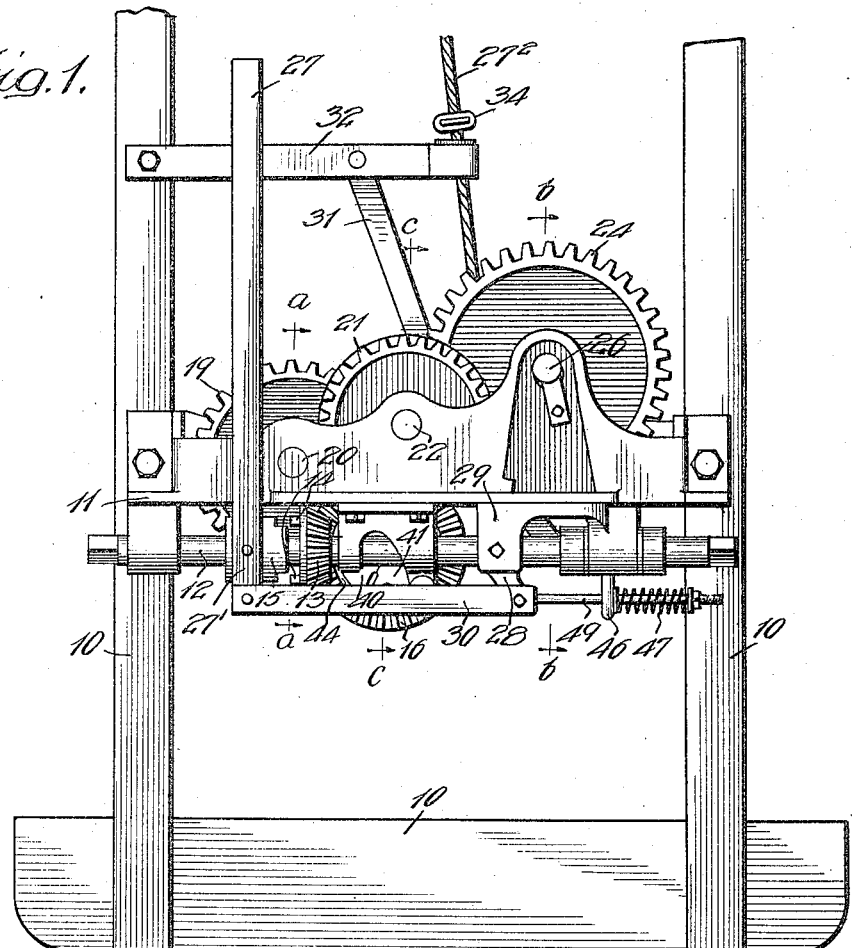

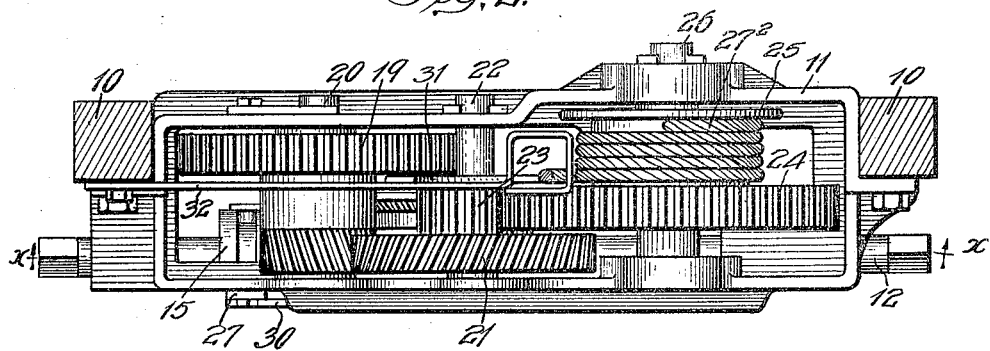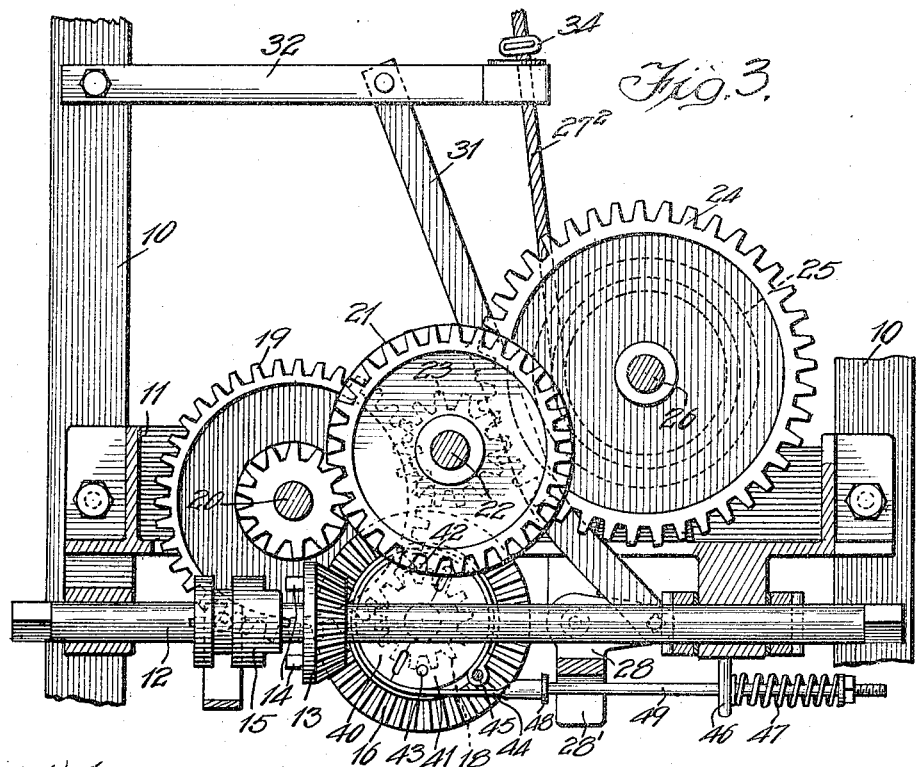

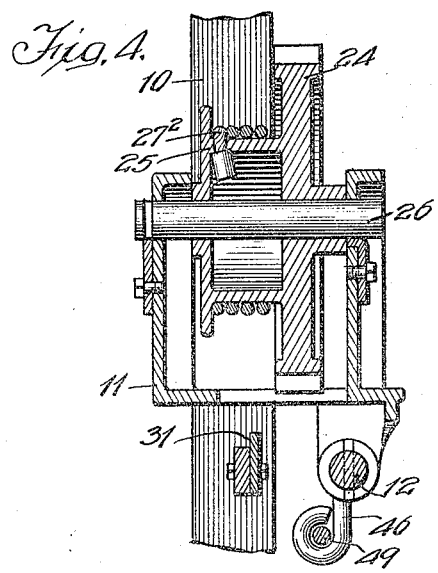
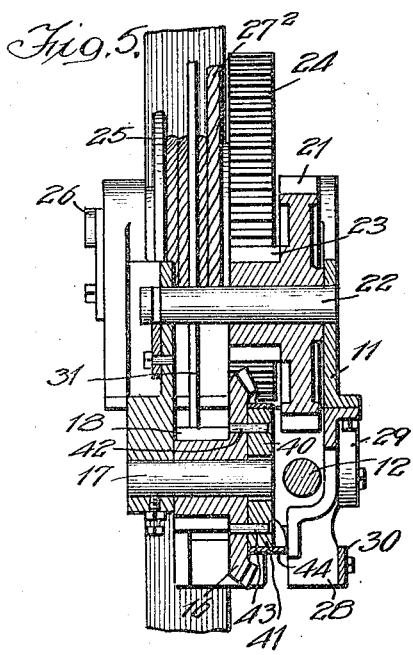
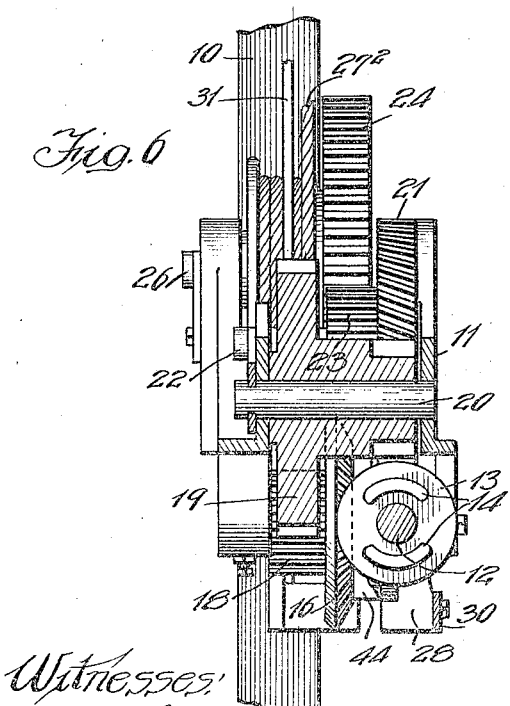
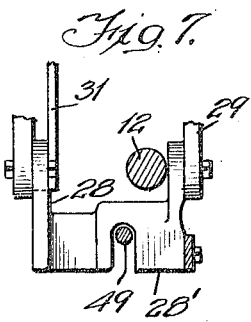

UNITED STATES PATENT OFFICE.

GEORGE B. READ, OF BLOOMINGTON, ILLINOIS.

HOISTING-JACK AND CONTROL THEREFOR.

1,305,006.　　　　　　Specification of Letters Patent.　　Patented May 27, 1919.

Application filed January 13, 1919. Serial No. 270,783.

*To all whom it may concern:*

Be it known that I, GEORGE B. READ, a citizen of the United States, residing at Bloomington, in the county of McLean and State of Illinois, have invented certain new and useful Improvements in Hoisting-Jacks and Controls Therefor, of which the following is a specification.

My invention consists of hoisting devices and controls therefor.

I have made special application of my invention to what is known as wagon jacks, which are used in connection with grain dumping and elevating devices.

The object of my invention is to produce actuating mechanism comprising a gear train effective for raising a load and retroactive under control to lower the load containing vehicle.

My invention includes a more or less specific arrangement of related gear parts, effective to promote proper speed reduction in the raising operation and serving through friction of parts measurably to check or retard in the lowering operation. Also my invention includes both manual and automatic controls for checking the upward movement and especially my invention includes governor acting mechanism associated with the train of gears and operative through speed action of the gear parts in the lowering operation to stabilize and equalize the speed in the lowering operation.

Referring to the drawings herewith accompanying:—

Figure 1, is a side elevation of a gear frame containing gear parts of my invention, the same being applied to a frame part of a wagon jack.

Fig. 2, is a top view of the same structural parts that are disclosed in Fig. 1.

Fig. 3, is a cross sectional view through the gear frame and gear parts that are shown in Fig. 1.

Fig. 4 is a vertical cross sectional view on the line *b—b* of Fig. 1;

Fig. 5 is a vertical cross section on the line *c—c* of Fig. 1;

Fig. 6 is a vertical cross section on the line *a—a* of Fig. 1.

Fig. 7, is a detailed view of a rocker element functioning in connection with control devices.

Fig. 8, is a detailed view showing the elements of a governor and in association with a gear member and with a band element.

My experience with the manufacture of what is known as wagon jacks or wagon dumps, has led me to note that positive control in the lowering operation or descent of the carrying vehicles is absolutely essential and that no device, to my knowledge, has been produced, except those involving friction, that was effective for this purpose. The simplest known devices used at present involve the idea of a friction control. They embrace, generally, a band brake of some nature and are provided with facilities for manipulating the band to effect brake action. This brake necessitates the constant attention of an operator and a constant manipulation of the brake band. Careless manipulation may and does lead to a free drop of the carrying vehicle.

I have especially herein directed my attention to an automatic control for the lowering operation, that obviates the necessity of the constant attention of an operator and also accuracy in the manipulation of control devices.

Incident to the general combination which effects the raising and the control devices used in connection with the raising operation, I have provided a governor mechanism, which in its application exercises the ordinary governor control. In this instance it comprises members movable through speed action to apply brake action. Its operation is completely successful in practice.

Referring to the drawings, my device is shown applied to a framework 10, which may have general reference to the frame structure of a wagon jack; 11, is a frame which may be cast or stamped in form, and its parts spaced relatively for housing or containing the principal gear elements of the device; 12, is a shaft suitably supported in the gear frame and is squared at its ends to accommodate connection from a driving element; 13, is a bevel gear mounted loosely on shaft 12. It is provided with clutch members 14; 15, is a sleeve clutch member, splined on shaft 12, and related to bevel gear 13, in a manner that through proper movement will engage the same and cause it to be turned and similarly by proper movement, release said gear that it may be at rest or may be free to turn upon shaft 12; 16, is a bevel gear supported and turnable on shaft 17, the latter being suitably supported in the gear frame; 18, is a gear member formed on the hub extension from bevel gear 16; power is transmitted from shaft 12 to bevel gears 13 and 16 to gear 18, which in turn actuates gear 19, carried upon shaft 20, and this in turn coöperates with gear 21, turnably supported on shaft 22, said gear being provided with hub extension on which gear 23 is formed, and the turning of gear 21 acts through gear 23 thereon to operate gear wheel 24, the latter having connection with the winding drum member 25, said gear and member being turnably supported on shaft 26, the latter being suitably supported in the gear frame. A cable member, as $27^2$, is attached at one of its ends to winding drum member 25, in suitable manner, and in practice is designed to be supported intermediate its ends upon the jack frame and to be finally connected with a load carrying vehicle directly or with members designed to support a load.

Obviously, if a driving relation is established between clutch 15 and bevel gear 13, movement will be ultimately transmitted through the winding drum member through the action of the intermediate members herein above indicated, and the cable will be wound thereon for the purpose of raising a load.

A hand lever control 27 (as shown in Fig. 1) is provided to manually operate or shift clutch sleeve 15. In the operation of the device for raising the load, while I have provided the means for manually braking the driving connection, nevertheless in practice it is found that a positive and automatically acting trip or disconnecting means must be provided, and to that end I have in this instance provided rocker member, as 28, journaled to the bracket member 29, a depending arm of which connects pivotally with bar 30, which said bar in turn is pivotally connected with an extension 27′ of lever 27, extending below the axial center of sleeve member 15 and serves when said rocker member is moved in the proper direction, to shift said sleeve clutch in disengagement of bevel gear 13. The particular means provided for automatically moving rocker member 28 comprises a reach or bar 31, pivoted at its lower end to a forwardly extending arm of rocker member 28 and at its upper end to a horizontally disposed reach or bar 32, at a point intermediate the ends of said bar, said bar being pivoted at one end to an upright of the jack frame 10, and its other end extending beyond its pivotal connection with reach 31 and being formed at its end in a manner to embrace cable $27^2$. A stop member, as 34, is fixed to cable $27^2$ at a predetermined point depending upon the height to which the load carrying vehicle is designed to be raised, and through the action of said stop member 34, as it strikes the outer end of arm or reach 32 as the cable is being wound up, it acts to depress said arm and thereby transmit its movement through bar 31, rocker member 28, bar 30 and extension 27′ from lever 27, to the sleeve clutch 15, to shift said clutch in disengagement of bevel gear 13, whereby the raising operation is interrupted and the vehicle is held in suspension. The upward movement of the loaded vehicle may be stopped at any intermediate point between the ground and the predetermined high point of raising, by a simple manual manipulation of lever 27, to cause disengagement of bevel gear 13.

Considering now the manner of holding the load in suspension and also controlling the lowering movement thereof, I call attention to Fig. 8, of the drawings, in which I show a pair of governor members 40—41, pivoted respectively upon pins 42—43, fixed upon the bevel gear 16. The governor members are pivoted eccentrically with relation to the axial center of gear 16, so that when said gear is rapidly rotated in a given direction, it will induce in the governor members an outward projection or bearing. A brake band 44 is disposed about the governor members and related thereto in such manner that normally (when the supporting gear for the governor members is inactive) it is in engagement with said governor members and acts as a check against the movement of bevel gear 16. The brake band is fixed at its inner end to a stud or pin 45 and at its outer end it is held by fixed eye member 46, under the tension of spring member 47, the latter having associated therewith the suitable washer and nut members to properly carry out a cushioning effect and also to provide for extending or retracting the brake band member to accommodate conditions of wear and the like. The brake band, as noted, normally applies brake action and thereby serves to hold the load in any desired position or elevation, or it may be retracted in relief of the governor members to permit reverse or retroaction of gears to permit the load to descend.

The particular means of effecting retraction of the brake band comprises a shoulder member or washer, as 48, on rod extension 49 from the brake band, acting in connection with rocker member 28; that is to say: after rocker member 28 is moved to cause a rearward movement of its downwardly extending arm portion 28′, either through the manual or automatically actuated connected parts, a further extension of such movement through manual force applied to lever 27, will cause the brake band to be retracted in relief of the governor members, thereby gear 16 and the complete associated gear train, acting under the gravity of the load, will turn to permit the load to descend. The rotation of gear 16, however, acting on the governor members to cause them to engage brake band 44, will retard the descent of the load. The descent by gravity is obviously under the constant control of the operator by means of the manipulation of lever 27. However, as previously noted, manual control is not sufficient guarantee against violent dropping of the load, and therefore, the governor action is interposed and completely supplements manual action, as will appear from observing the arrangement and disposition of the governor element, where it will be seen its brake action is always in proportion to the speed of gear 16, and as gear 16 is one of the members of the train that is exercised in the lowering operation, a control of its action controls the action of all. If the load is descending too rapidly, it will immediately be checked and brought to a regular and practically fixed speed through the balance of the lowering movement.

In the operation of the device, power being applied to shaft 12, the same will be turned. With the parts in the relative positions shown in Fig. 1 the shaft runs idle. To cause the load to be raised, lever 27 is operated to cause sleeve clutch 15 to engage clutch members on bevel gear 13, causing the lever to be turned and through its action the complete train leading to the winding drum will be operated to raise the load. The direction of travel of gear wheel 16 in the raising operation is that indicated by the arrow shown in solid lines (see Fig. 8). The governor members merely bearing against the surface of bevel gear 16. However, the operation is so slow that no material brake action is exercised. The raising of a load may be interrupted at any point desired, by merely shifting clutch sleeve from engagement with bevel gear 16, and the load will be held through the normal brake action of the brake members. The maximum high point to which the load is designed to be raised is determined by the stop member 34 on cable 27², the same acting upon pivoted bar 32 causes connecting elements with sleeve 15 to be acted upon to effect a shifting of the clutch to release gear wheel 13 and the brake band instantly acting to effectually hold the load in suspension.

To lower the load it is necessary only to apply hand pressure to lever 27, sufficient to act through its train of connection with the brake band to relieve the normal pressure thereon of the governor elements, and immediately the load will descend and as it descends the governor members acting through its braking force, regulated by the speed of gear wheel 16, will perfectly control the speed of the descent. When the load reaches the ground and lever 27 is released, the normal braking action of the brake band will serve to prevent the gears from further back turning.

In applying my invention, its gear parts may be differently arranged and proportioned to suit conditions of use, and the particular details illustrated, that serve to control the lowering of the load may be modified and changed as may be desired, so long as the functioning governor members are maintained. All of this may be done without departing from the spirit and principles of my invention.

What I claim is:

1. In a device of the class described, in combination, means connectible with a wagon for raising it, a driving element, gearing connected with the elevating means and connectible with the driving element, a suitable clutch for controlling the connection between said gearing and the driving element, a brake comprising opposed members both relatively adjustable but normally related to apply brake action when the gearing and elevating means are at rest, but yieldable relatively to permit the gears to run in the elevating action, and also relatively operable through the turning action of the gear members to develop limited brake action between the opposed members in proportion to the speed of the gear in the lowering movement for controlling the speed of such lowering action, and manually controlled means applicable to one of the brake members for spacing the latter from its opposed member to permit the lowering or retroaction of said gear members in the lowering action.

2. In a device of the class described, in combination, a suitable support, gear train comprising gear members relatively proportioned and related for proper speed reduction, a drum connected to be driven from said gear train, a cable windable on said drum, means for supporting the cable in a running relation on the supporting frame, a continuously driven member, a clutch on said member related to said gear train for engagement or release thereof, means for manually effecting engagement or release of the clutch member of the train, automatic means for releasing such clutch engagement at a predetermined high point in the raising operation, a brake, comprising movable members associated with one of the gears of the gear train, and a brake band related to said movable brake members to permit free movement of the gear train in the raising operation and to apply brake action in the lowering operation proportionate to the speed of such lowering movement.

3. In a device of the class described, in combination, a suitable support, a gear train associated with such support, including a drive shaft serviceable for raising a load and measurably for controlling the lowering thereof, a drum associated therewith, a cable connected with said drum, means for supporting the cable in a running relation upon said support, means for effecting a disconnection of the gear train from said drive shaft, a brake comprising movable members on one of the members of the gear train, and a brake band associated therewith, related to said movable brake members to permit free movement of the gear train in the raising operation and to apply brake action in the lowering operation proportionate to the speed of such lowering movement.

4. In a device of the class described, in combination, a suitable support, a train of gears associated with the said support, a drum member associated therein, a constantly driven shaft, a clutch member thereon engageable with the gear train, means both manual and automatic for interrupting the clutch connection between the drive shaft and the gear train, a brake comprising members connected with one of the gears of the train and operable to induce limited brake action, a brake band related to the brake members on the said gear, in a manner to permit the members of the gear train to turn during the raising operation but to automatically act to prevent retroaction of the gear train when the latter is at rest, and means actuated through the clutch disengaging means for relaxing the normal braking tension to permit retroaction of the gear train induced by the load, whereby the movable members on the member of the gear train may be actuated to apply brake action to the brake band regulated by the speed of the gear to control the descent of the load.

5. In a device of the class described, in combination, a frame or derrick member, a train of gear members suitably related to effect the desired speed relation, a drum member connected with the gear train, suitable housing for the gear train and drum member connected with the frame or derrick, a cable, one end connected with the drum, the other end connected with a load and supported from the derrick or frame in a runable manner intermediate its ends, a drive shaft, clutch means connecting the drive shaft with the gear train, operable manually and automatically, in course, to effect disengagement of clutch parts of the clutch mechanism, a brake member comprising parts pivoted eccentrically to a gear member of the train, and movable through speed action of said gear member, a brake band related to the brake parts on said gear in a manner to permit the members of the gear train to turn during the raising operation but to automatically act to prevent retroaction of the gear train when the latter is at rest, and means actuated through the clutch disengaging means for relaxing the normal braking tension to permit retroaction of the gear train induced by the load, whereby the movable parts on the member of the gear train may be actuated to apply brake action to the brake band, regulated by the speed of the gear, to control the descent of the load.

6. In a device of the class described, in combination, a frame or derrick, a set of related gear parts, a drum member, connected with the gear parts, suitably connected to the frame, a cable connected with the drum, a driving shaft, associated with the gear set, clutch means for engaging the gear set and movable thereby, and a brake band suitably supported and related to the said movable parts to permit the gear set to advance in performing the raising operation but operable to prevent retroaction thereof, and means for disengaging the clutch mechanism from the gear set, including associated means manually operable for spacing the brake members relatively to permit retroaction of the gear set.

7. In a device of the class described, in combination, a frame or derrick, a gear set, a drive shaft associated therewith, a clutch means relating the said shaft to the gear set, a drum member connected to be driven from the gear set, a cable connected with the drum, means actuated through the movement of the gear set to automaticaly disengage the clutch mechanism, means for manually effecting such disengagement and governor acting mechanism associated with the gear set, acting normally, to permit advancement of the gear train but acting automatically to prevent retroaction thereof, said governor means including coöperative parts acting, through proper relative spacing of parts thereof, to permit reverse movement of said gear train and manual means for effecting a proper spacing of the parts of the governor member to permit such retroaction of the gear parts under the control mentioned.

8. In a device of the class described, a frame or derrick, a gear set on the support, a drive shaft associated therewith, a clutch member on the shaft engageable with the gear train, a lever manually operable for shifting the clutch member, a drum connected with the gear train, a cable, one end thereof connected with said drum and windable thereon, and the other end with a load to be raised, a governor member comprising parts eccentrically related to one of the gear members of the train and movable thereby and therewith, a brake band fixed at one end and held under yielding tension, at its other end, normally in engagement with the governor members on the gear train, and means operable from the movement of clutch control for spacing the brake band member from the governor members on the gear train, whereby the governor under normal conditions will permit the gear train to advance but will hold the same against retroaction when said gear train is at rest, but, under the condition of relative spacing under the control of the operator, retroaction of the gear train, induced by the load, occurs and at the same time variable friction control will be exercised through the movable governor members, on the brake band, according to the speed of the gear train.

9. In a device of the class described, in combination, a frame, or derrick, a gear train support, in connection therewith, a drive shaft associated with the gear train, clutch means interposed between the shaft and the gear train, a drum connected with the gear train, a cable windable thereon, means for effecting clutch disengagement, operable manually and also, through proper connections, automatically, through direct action of the gear train, governing means, including a normally fixed brake member and brake parts associated with the gear train, effective in the complete operation of the device to permit the gear to be advanced for the purpose of elevating a load, and to hold the gear train against retroaction when the latter is at rest, and under abnormal conditions of spacing the brake band from the governor members reverse action of the latter will occur, inducing frictional engagement between said brake band and brake members, variable according to the speed of the latter, and means for effecting such relative spacing of the brake band and governor members.

In testimony whereof I affix my signature.

GEORGE B. READ.

Copies of this patent may be obtained for five cents each, by addressing the "Commissioner of Patents, Washington, D. C."